March 29, 1966   A. SCHLOSBERG   3,242,956
SAW OR FLUSH SAWING DEVICE
Filed May 21, 1964

INVENTOR.
AARON SCHLOSBERG
BY
ATTORNEYS.

United States Patent Office 3,242,956
Patented Mar. 29, 1966

3,242,956
SAW OR FLUSH SAWING DEVICE
Aaron Schlosberg, 5 Brighton 10th Terrace,
Brooklyn, N.Y.
Filed May 21, 1964, Ser. No. 369,239
11 Claims. (Cl. 145—33)

The present invention relates to a novel saw or flush sawing device.

In the building trade in particular it is oftentimes necessary to saw a protruding part flush or almost flush to a flat surface from which it protrudes.

In the setting in of toilets in a construction site lead elbows have to be fitted in where the toilet is to be set and then must be cut down to size. The size usually provides a small protrusion above the floor surface.

In the past the sawing of the lead elbows has generally been done by hand. The sawing is slow and uncomfortable since the user of the saw usually has his knuckles close to the floor surface in order to make the cut. Knuckles and hands are often scratched or bruised in flush sawing by conventional means.

According to the present invention an adjustable saw is provided adopted for easy sawing of pieces protruding from a relatively flat surface and adjustable for different types of saw blades and different desired levels of cut above a surface.

Although such novel feature or features believed to be characteristic of the invention are pointed out in the claims, the invention and the manner in which it may be carried out, may be further understood by reference to the description following and the accompanying drawings.

Referring now to the figures in greater detail, where like reference numbers denote like parts in the various figures.

Figure 1:
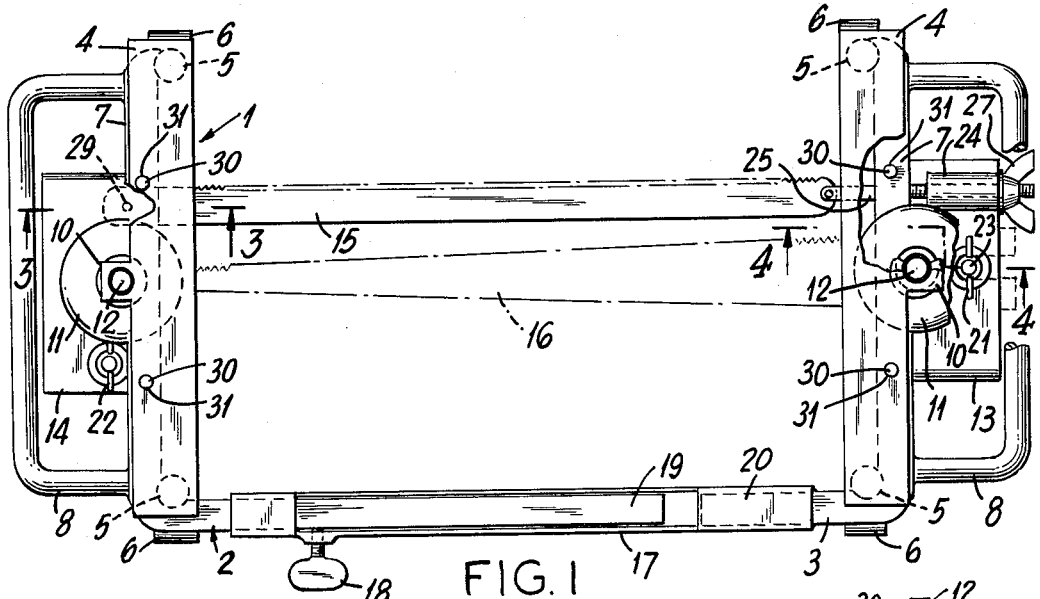
FIG. 1 is a plan view of the sawing device of the present invention.
Figure 2:
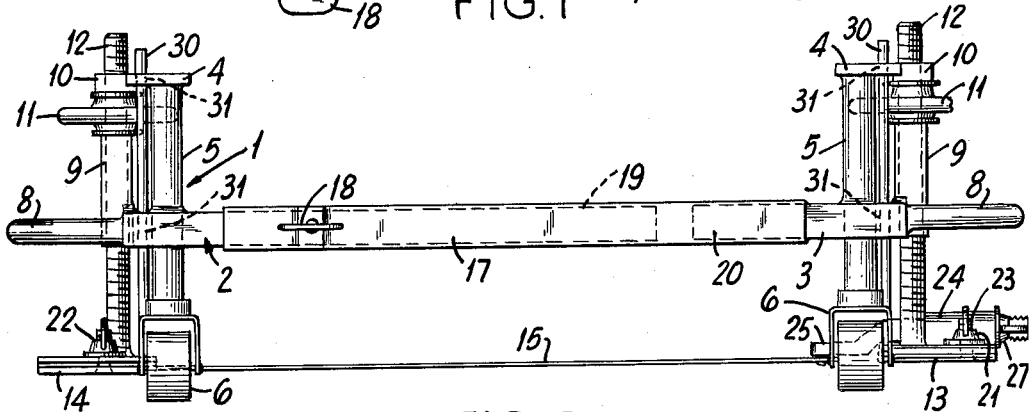
FIG. 2 is a front elevation of FIG. 1.

The sawing device 1 of the present invention basically comprises a U-shaped frame 2, with a back portion 3 and extending side portions 4. The entire frame 2 is supported by uprights 5 which have some form of bearing means for multidirectional movement. As illustrated in the figures, casters 6 are provided. The uprights 5 are braced by cross pieces 7 shown at the cutaway portion of the side piece 4 in FIG. 1.

Extending horizontally from the uprights 5 at the brace line are handles 8. Inside the handle 8 areas are tubes 9 which are aligned with flanges 10 and spaced apart enough to snugly receive threaded wheels 11.

Threaded shanks 12 extend through the tubes 9 and flanges 10 engaged in the threads of the wheels 11. Each shank 12 is attached at its base to a blade holding unit 13, 14.

The blade holding units 13, 14 are adapted to hold a large variety of saw blades 15, 16 as indicated in FIG. 1. In use only one saw blade 15, 16 at a time is advisable to use.

The frame back 3 comprises a tube 17 which may be open and a clamping means such as a thumbscrew 18 passing through threads in the tube 17 and impinging on the rod 19. The tube 17 must be integrally joined to the one end portion 20 of the frame back 3.

As shown in the embodiment in the figures, the blade holding units 13, 14 form a sandwich closeable by wing nuts 21, 22. A saw blade 16 may be inserted into the sandwich of one blade end holder 13 and around the wing nut screw 23 and tightened into place by turning the wing nut 21.

Once the frame back 3 has been adjusted to the blade length the other end of the blade 16 may be tightened into the other blade end holding sandwich 14.

Figures 3, 4:
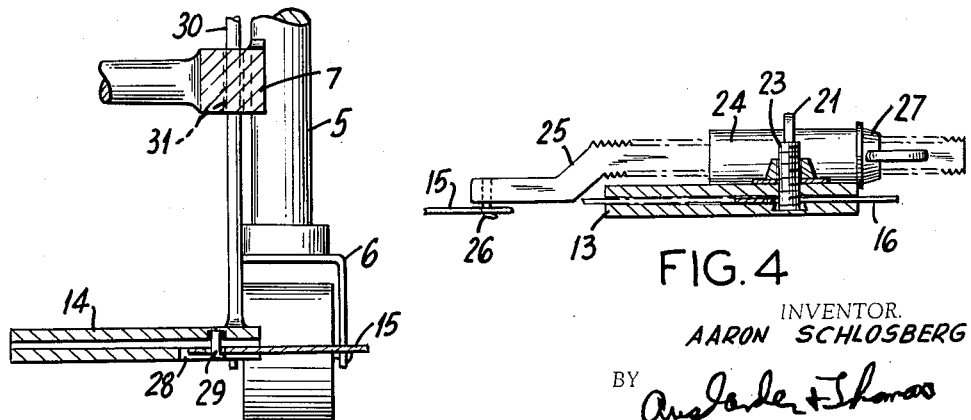
FIG. 3 is a detail of FIG. 1 at lines 3—3.
FIG. 4 is a detail of FIG. 1 at lines 4—4.

For using a hacksaw blade 15, as shown in detail in FIG. 4, a tube 24 is mounted on top of the blade holding unit 13. The tube is wide enough to allow a thread square shank 25 to pass through. The shank 25 is offset so that its lower portion is approximately on a level with the bottom of the blade holding unit 13. The shank 25 has a finger 26 which may be curved somewhat to accept a hacksaw blade 15. A straight finger 26 will also hold the blade but may allow a blade 15 to more easily disengage. The shank 25 is provided with a wing nut 27 for taking up slack and adjusting the hacksaw blade 15 to proper tension.

The other end of the hacksaw blade 15 is attached at the other blade holding unit 14 as shown in detail in FIG. 3. A section 28 of the lower portion blade holding unit 14 is cut away and a pin or finger 29 which may be curved somewhat extends downward to receive the other end of the hacksaw blade 15 and hold it at a level even with the bottom of the blade holding unit 14.

Vertical guides 30 extend through aligned openings 31 in the side portions 4 of the frame 2 and in the cross-pieces 7.

In use with a saw blade 16 such as a compass saw blade, as heretofore mentioned, only one blade should be used at one time, one end of the blade 16 is tightened into the blade holding unit sandwich 13 by tightening the wing nut 21. The thumb screw 18 is loosened and the size of the back portion 3 of the frame 2 is adjusted to the blade 16 size. The second end of the blade 16 is engaged in the blade holding unit 14 sandwich and tightened, thereby adjusting the wing nut 22.

For using the hacksaw blade 15, it is generally advisable to adjust the size of the back 3 of the frame 2 first, then take up the slack in the blade 15 by adjusting the wing nut 27 for a tight fit.

In operation with a selected blade, the sawing device may be adjusted for different levels of cutting from flush to the height of the crosspiece 7. The shanks 12 may be scaled for adjustment (not shown) for convenience.

The height level is vertically adjusted by lowering or raising the blade holding units 13, 14 by rotating the wheels 11. The shanks 12 held between the tubes 9 and flanges 10 and guided by the vertical guides 30 move up or down as desired along the threads of the wheels 11.

Once the blade 15, 16 has been selected, mounted and the cutting level adjusted, sawing is easily effectuated by setting the blade 15, 16 at the object (not shown) to be cut, then rolling the sawing device 1 back and forth in a normal sawing motion. This device 1 is held by the handles 8, preferably pressed downward and rolled along the casters 7.

Within the purview of the present invention is the use of ball bearings or other universal movement means in the uprights 5 to allow free movement. The adjustment means for the frame 2 and the blade holding units 13, 14 are also exemplary.

The terms and expressions which are employed are used as terms of description, it is recognized, though, that various modifications are possible within the scope of the invention claimed.

Having thus described certain forms of the invention in some detail, what is claimed is:

1. A sawing device comprising a generally U-shaped frame of horizontal configuration adapted to hold both ends of a cutting blade across the open mouth of the "U", upright support means on opposite sides of said frame, said upright means including bearing means adapted to multi-directional movement, handle means outside the frame means, and saw blade mounting means carried by said frame adapted to mount a saw blade.

2. A sawing device comprising a generally U-shaped frame of horizontal configuration adapted to hold both ends of a cutting blade across the open mouth of the "U," upright support means on opposite sides of said frame, said upright means including bearing means adapted to multi-directional movement, handle means on said upright means outside the frame means, and saw blade mounting means including vertical adjustment means carried by said frame adapted to mount a saw blade between said opposite upright means.

3. A sawing device comprising a generally U-shaped frame of horizontal configuration adapted to hold both ends of a cutting blade across the open mouth of the "U," said frame having an adjustable back portion, upright support means on opposite sides of said frame, said upright means including bearing means adapted to multi-directional movement, handle means and said upright means being outside the frame means, and saw blade mounting means including vertical adjustment means carried by said frame and upright means and adapted to mount a saw blade between said opposite upright means.

4. A sawing device comprising a generally U-shaped frame of horizontal configuration adapted to hold both ends of a cutting blade across the open mouth of the "U," said frame having an adjustable back portion, upright support means on opposite sides of said frame, said upright means including bearing means adapted to multi-directional movement, handle means on said upright means outside the frame means, and saw blades mounting means carried by said frame adapted to mount a saw blade.

5. A sawing device comprising a generally U-shaped frame of horizontal configuration adapted to hold both ends of a cutting blade across the open mouth of the "U," said frame having an adjustable back portion, upright support means on opposite sides of said frame, said upright means including bearing means adapted to multi-directional movement, handle means outside the frame means, saw blade mounting means between said opposite upright means carried by said frame adapted to mount a saw blade, each of said saw blade mounting means having vertical adjustment means including spaced apart flange aligned tube means, threaded shank means extending through said tube means adapted to receive turning means to vertically adjust each of said saw blade means.

6. A sawing device comprising a generally U-shaped frame of horizontal configuration adapted to hold both ends of a cutting blade across the open mouth of the "U," said frame having an adjustable back portion, upright support means on opposite sides of said frame, said upright means including bearing means adapted to multi-directional movement, handle means outside the frame means, and saw blade mounting means carried by said frame adapted to mount a saw blade, said saw blade mounting means including vertical adjustment means, said vertical adjustment means including spaced apart flange aligned tube means, threaded shank means extending through said tube means adapted to receive turning means to vertically adjust each of said saw blade mounting means and guide means for said vertical adjustment means.

7. A sawing device comprising a generally U-shaped frame of horizontal configuration adapted to hold both ends of a cutting blade across the open mouth of the "U," said frame having an adjustable back portion, upright support means on opposite sides of said frame, said upright means including casters, handle means outside the frame means, and saw blade mounting means carried by said frame adapted to mount a saw blade.

8. A sawing device comprising a generally U-shaped frame of horizontal configuration adapted to hold both ends of the cutting blade across the open mouth of the "U," upright support means on opposite sides of said frame, said upright means including bearing means adapted to multi-directional movement, handle means outside the frame means, saw blade mounting means carried by said frame including a first end; comprising an upper plate; a lower plate; and tightening means; a second end; comprising an upper plate; a lower plate; and tightening means, said saw blade mounting means including vertical adjustment means.

9. A sawing device comprising a generally U-shaped frame of horizontal configuration adapted to hold both ends of a cutting blade across the open mouth of the "U," said frame having an adjustable back portion, upright means on opposite sides of said frame, said upright means including bearing means adapted to multi-directional movement, handle means outside the frame means, and saw blade mounting means carried by said frame on one side of said U-shaped frame including a tube; a threaded shank; a finger extending from said shank adapted to receive a saw blade; and screw means on said shank outside said tube; and a second mounting portion on an opposite side of said U-shaped frame including a finger adapted to receive a saw blade.

10. A sawing device comprising a generally U-shaped frame said frame having a two-section back portion and extending side portions, adjustment means adapted to adjust the length of the back portion said frame said adjustment means including tube means joining the two sections of said back portion and clamping means to impinge said tube in a fixed position on said back portion, upright support means on opposite sides of said frame, said upright means including bearing means adapted to multi-directional movement, handle means outside the frame means, and saw blade mounting means carried by said frame adapted to mount a saw blade.

11. A sawing device of horizontal configuration adapted to hold the ends of a cutting blade comprising a frame including a first side; a second side, an integral rear portion; said rear portion including length adjustment means, at least four uprights extending from said frame, each said upright including bearing means adapted to multi-directional movement, handle means mounted on said uprights, and saw blade mounting means carried by said frame including; means adapted to mount a hacksaw blade; vertical adjustment means.

References Cited by the Examiner
UNITED STATES PATENTS
3,038,255    6/1962   Zabransky _____ 30—166 X FOREIGN PATENTS
457,472    6/1949   Canada.

WILLIAM FELDMAN, Primary Examiner.
R. V. PARKER, JR., Assistant Examiner.